June 29, 1943.   C. R. NEESON ET AL   2,322,874
COMPRESSOR OIL COOLING SYSTEM
Filed Nov. 21, 1941
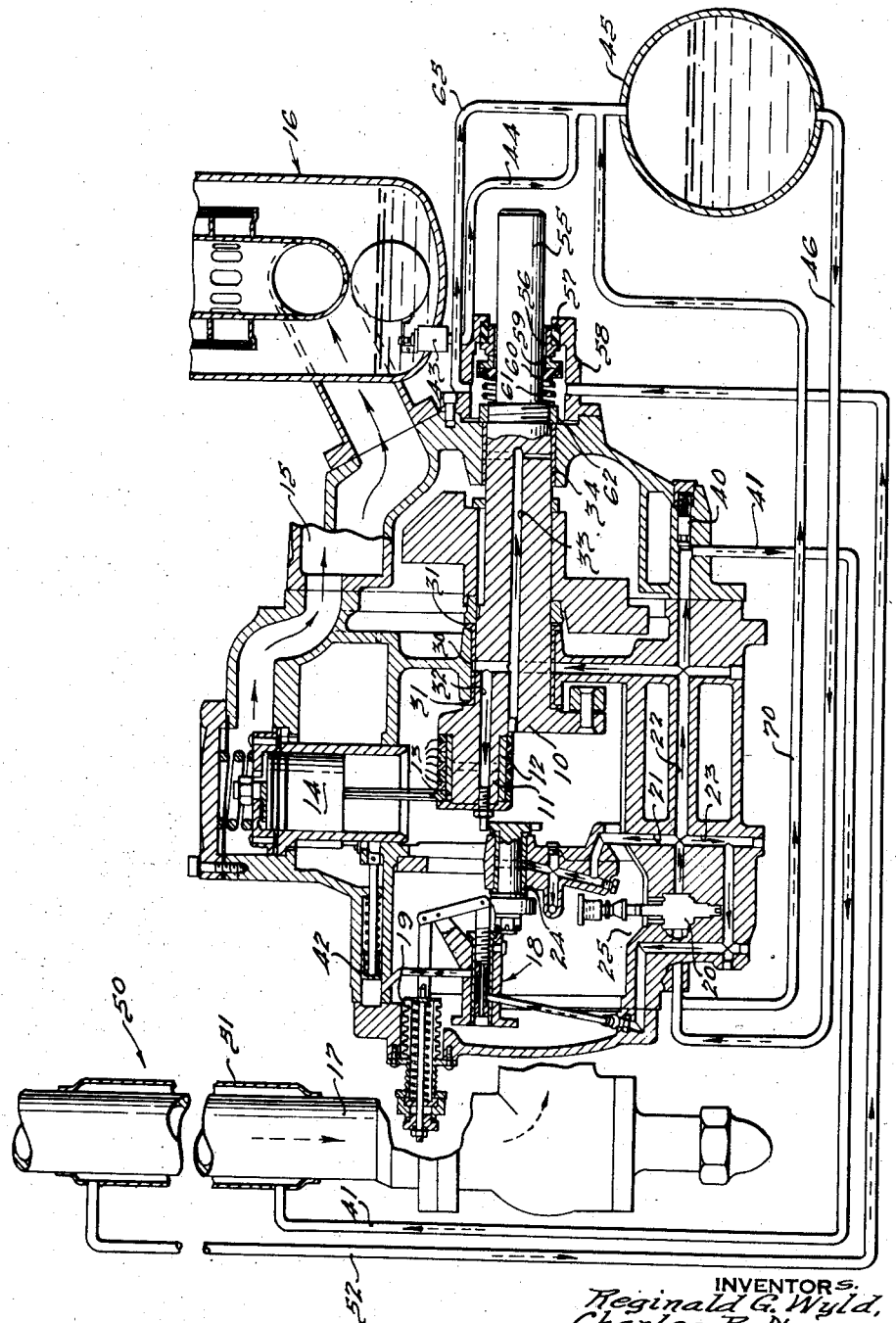
INVENTORS.
Reginald G. Wyld,
Charles R. Neeson.
BY
Harness, Lind, Pate & Harris
ATTORNEYS.

Patented June 29, 1943

2,322,874

UNITED STATES PATENT OFFICE 2,322,874

COMPRESSOR OIL COOLING SYSTEM

Charles R. Neeson and Reginald G. Wyld, Dayton, Ohio, assignors to Chrysler Corporation, Detroit, Mich., a corporation of Delaware Application November 21, 1941, Serial No. 419,888

3 Claims. (Cl. 62—115)

Our present invention relates to the lubrication of refrigerant compressors of the type having a force-feed lubrication system and a shaft seal. One object of the present invention is to maintain the temperature of the lubricant at a safe temperature so as to maintain the viscosity and lubricating quality of the lubricant within specified ranges.

A further object of the present invention is to provide means for cooling the friction surfaces of a shaft seal so as to eliminate seal failures due to overheating of the friction members or gaskets of the shaft seal. This is of importance in high-speed compressors of the type under consideration since the friction surfaces of the seal may be of such character as to melt or bind together or transmit sufficient heat to other members forming the shaft seal, such as gaskets, to cause them to fail. In one type of shaft seal one of the friction surfaces is formed on a ring of solidified carbon having particles of a lead alloy imbedded therein, and the other surface is formed on a ring of a very hard, dense, metallic alloy. Overheating of this type of seal may cause the lead particles to melt and run out of the carbon, thereby causing the shaft seal to fail. In some shaft seals the friction surface members are imbedded in, or in contact with, gasket rings of artificial rubber which are likely to harden and crack or disintegrate under excessive temperatures. In the event of a shaft seal failure serious consequences may occur, such as the loss of an entire refrigerating system charge of expensive refrigerant, or the spoilage of valuable commodities being kept by refrigeration, such as furs, flowers, meats, vegetables, and countless others. It thus becomes extremely important to maintain the shaft seal at a cool, safe temperature, and the problem of shaft seal failures represents one of the most serious in the refrigeration industry.

A further object of the present invention is to provide means for maintaining the lubricant used in a refrigerating compressor at a temperature within limits specified by the manufacturer of the lubricant, since increased temperature means lowered viscosity and lowered viscosity means impaired lubricating value. In high speed modern compressors very intense loading values are placed on some of the bearing surfaces, and serious reduction of the viscosity of the lubricant may mean bearing seizure and failure of the compressor, which would be just as serious as failure of the shaft seal. The present invention comprises means for cooling a portion of the oil used in the compressor by collecting the oil escaping from bearing surfaces and passing at least some of the oil through a pump of greater capacity than that needed to lubricate the bearings, by-passing a portion of the output of the pump through a heat exchanger including a portion of the suction inlet of the compressor and having a capacity greater than that required to remove all of the heat imparted to the oil by the bearings and by the shaft seal, and by the heat of compression, and then returning the by-passed oil to the pump by way of the shaft seal. It is important that the capacity of the thermal exchanger be greater than that required to remove the heat imparted to the oil by the bearings and seal, since some heat is imparted to the oil by the compressed refrigerant.

The objects and advantages of the present invention will be more readily apparent from the following specification taken in connection with the accompanying drawing wherein a preferred embodiment of the present invention is illustrated in combination with a compressor of a known type.

In the drawing, the compressor is illustrated as comprising the type disclosed and claimed in the Patent to Charles R. Neeson, No. 2,185,473, issued January 2, 1940. The compressor comprises a shaft 10 having a crankpin 11 upon which is mounted a bearing bushing 12 carrying the large ends of a plurality of connecting rods 13, each of which is connected to a piston 14 radially located in a compressor casing. The gases compressed by pistons 14 discharge into a discharge manifold 15 from which the hot compressed gases pass through an oil separator 16. Refrigerant is supplied to the pistons through a suction inlet pipe 17 having suitable connection to the compressor (not shown). As explained in the aforementioned patent, the capacity of the compressor may be controlled by unloading means including an oil pressure operated master valve 18 and suction pressure operated bellows 19.

The compressor comprises a lubricating system including pumping means (not shown) mounted in the pump housing 20 and which forces lubricant through outlet passages 21, 22, and 23. The lubricant flowing through outlet passage 21 lubricates the bearings 24 and other portions of the pump driving means, as illustrated in the aforesaid patent. Lubricant escapes from these portions of the apparatus and drains into the collecting sump 25 at the bottom of the compressor from which extend inlets to the pump housing 20. Lubricant flowing through outlet 22 passes through a distributing space 30 between halves 31 of a main shaft bearing and into a passage 32 leading to the bushing 12 and adjacent surfaces of the connecting rods 13, and also passes therefrom into a passage 33 leading to a second main shaft bearing 34. Most of the oil which escapes from the bushing 12, and from between the connecting rods 13, and from the bearings 31 and 34, also drains into the sump 25. Some of the oil escaping from between the large ends of the connecting rods 13 is flung radially outward against the pistons 14 to lubricate the walls of the cylinders surrounding the pistons and the connecting rod wrist pins. Most of this oil eventually finds its way to the sump 25 after being considerably heated, not only by cooling the bearing and friction surfaces with which it comes in contact, but also by extracting some heat from the cylinder walls imparted thereto by the compression of the refrigerant.

The passage 22 terminates against the plunger end of a pressure relief valve 40 adapted to open, to variable extents, a by-pass passage 41. The pressure relief valve is designed to maintain the pressure in the lubricating system at a desired point sufficient to force lubricant through the bearing surfaces. Likewise, the pressure so maintained is sufficient to operate unloading means including the individual cylinder unloading pistons 42 as selected by the master valve 18 which is connected to the pump by passage 23.

Oil which may be entrained with the refrigerant passing through the discharge manifold 15 is separated from the refrigerant and collected in the oil separator 16 which includes a float operated valve 43 adapted to open and discharge refrigerant through a pipe 44 connected to an oil tank 45. The oil tank 45 is connected by a tube 46 to the suction inlet of the oil pump so that the pump receives lubricant from the oil tank 45 as well as from sump 25, thereby insuring a continuous supply of all the lubricant required.

All details so far disclosed may be ascertained from an inspection of the aforementioned patent.

In the present invention the by-pass tube 41 is connected to a thermal exchanger 50 including a tube 51 of larger internal diameter than the external diameter of the suction inlet pipe 17, the space between the surfaces of the tube being relatively confined so as to bring oil into close association with the cold surface of the suction inlet pipe. The ends of the tube 51 are preferably restricted and soldered or otherwise adhered to the surface of the pipe 17. The tube 41 is preferably connected to the lower end of the tube 51, and an outlet 52 is preferably connected to the upper end of the pipe 51, the tube 51 being preferably attached to a vertical section of the inlet pipe 17 so as to provide counterflow of the refrigerant and the lubricant and to insure complete cooling of the lubricant. The length of the tube 51 is preferably such that the thermal exchanger so formed, at the prevailing temperature of the oil approaching the thermal exchanger and the normal suction temperature of the refrigerant, has a thermal exchange capacity greater than the heat imparted to the lubricant by all of the bearing surfaces from which the oil has escaped and by the amount of heat imparted thereto by the heat of compression. The extra capacity of the thermal exchanger preferably represents a capacity sufficient to overcome the heating effect of the shaft seal, which also heats the lubricant as will presently appear.

The shaft 10 comprises an extension 55 adapted to be connected to a motor or other prime mover, the extension 55 extending outward beyond the confines of the compressor housing. The extension 55 is shown in association with a type of shaft seal disclosed and claimed in the patent to Robert W. Christman and Willett J. McCortney, No. 2,200,413, issued May 14, 1940, from which details of the shaft seal may be ascertained. Other types of seals may be used but the foregoing represents a successful type. The seal comprises a fixed friction ring 56 supported by a gasket 57 mounted in the end of a seal housing 58 attached to the end of the compressor housing. A friction surface on the ring 56 engages a friction surface on a rotating friction ring 59 held in contact with a rotating gasket 60 against which presses one end of a spring 61, the other end of which engages a lock nut 62 maintaining the shaft in position. The rotating gasket 60 seals the refrigerant against escaping from between the rotating ring 59 and the shaft extension 55. The gasket 57 seals the refrigerant against escaping from between the stationary ring 56 and the end of the seal housing 58. The meeting surfaces of the friction rings 56 and 59 provide the friction sealing surfaces holding the refrigerant in the compressor housing. One of the rings 56 or 59 is formed of a hard, dense alloy and the other of the rings is usually formed of a carbon-lead conglomeration.

This general type of seal was originally conceived for the purpose of sealing slow speed compressors having speeds not in excess of 800 R. P. M. In applicants' compressor the ordinarily selected speed is that of an ordinary electric motor, or 1,750 R. P. M. At the excessive speeds thus used the dense alloy in one of the friction rings carries away sufficient heat to heat the gaskets to temperatures at which the gasket material may begin to alter in physical structure, so that after a considerable period of time hardening and subsequent failure of the gasket material may occur. Also, the heat generated by the friction rings may be sufficient to melt the particles of lead imbedded in the carbon ring, and it is theorized that some seal failures are due to adherence between the lead-carbon ring and a lead film deposited on the dense alloy ring. Whatever the cause of seal failure may be, the remedy therefor would be to maintain the friction rings at a temperature below the critical temperature of the gasket material and below the melting point of lead.

We achieve this object in our invention by passing the lubricant emerging from the thermal exchanger 50 immediately in complete contact with as much of the friction rings as can be reached by flooding the interior of the seal housing 58 on the compressor side of the seal. This is accomplished by connecting the tube 52 to the bottom of the seal housing and by connecting a discharge tube 65 to the top of the seal housing and to the oil tank 45. The oil so passed through the seal housing is the coolest oil available in the entire assembly and is in sufficient quantity to carry away the generated heat.

In some sizes of compressor, according to the disclosure of the aforementioned Neeson patent, more oil is permitted to escape into the interior of the compressor housing than can be handled by the force-feed pump. In such case a second pump (not shown) is provided having suction connection to the sump 25 and having its outlet connected to a tube 70 leading the oil so scavenged from the compressor housing directly to the tank 45. All of the oil thus drained from the compressor by the action of the scavenging pump, all of the oil returned from the shaft seal, and all of the oil returned from the oil separator are mixed in the oil tank 45. Preferably, the thermal exchanger 50 is of such capacity, and the stream of oil passing therethrough is of such quantity, as to provide enough cool oil to reduce to a desired extent the temperature of all the oil returned to the tank 45 through tubes 44, 65, and 70. In smaller sizes of this type of compressor no scavenger pump is provided, and the capacity of the thermal exchanger 50 and the quantity of oil passed therethrough need only be such as to cool the oil returned to the tank 45 through the tubes 44 and 65.

Having described a preferred embodiment of the present invention, it should be apparent to those skilled in the art that the same permits of modifications in detail and arrangement thereof. All such modifications as come within the scope of the following claims are considered a part of our invention.

We claim:

1. The combination with a refrigerant compressor comprising a housing, a suction inlet pipe attached thereto for conducting refrigerant into said housing, compressing mechanism enclosed in said housing, a force-feed lubrication system of the type including a pump for forcing lubricant to lubricated surfaces of the compressing mechanism, the lubricant escaping between certain of said surfaces into the interior of the compressor housing to be collected, admitted to said pump and recirculated through said lubrication system, a compressing mechanism driving shaft extending through an opening in said housing, and a shaft seal for preventing the escape of refrigerant from the interior of said housing through said opening; of means for by-passing a portion of the output of said pump around said lubricated surfaces and through a heat exchanger including a portion of said suction inlet pipe, means for passing the lubricant emerging from said heat exchanger in thermal exchange with said shaft seal, the capacity of said heat exchanger being such as to extract more heat from the lubricant passing therethrough than is imparted to all of the lubricant by the lubricated surfaces of the compressor and by said shaft seal, and means for returning the by-passed lubricant to the force-feed lubrication system after passing in thermal exchange with said shaft seal.

2. The combination with a refrigerant compressor comprising a housing, a suction inlet pipe attached thereto for conducting refrigerant into said housing, compressing mechanism enclosed in said housing, a force-feed lubrication system of the type including a pump for forcing lubricant to lubricated surfaces of the compressing mechanism, the lubricant escaping between certain of said surfaces into the interior of the compressor housing to be collected, admitted to said pump and recirculated through said lubrication system, a compressing mechanism driving shaft extending through an opening in said housing, and a shaft seal for preventing the escape of refrigerant from the interior of said housing through said opening; of means for by-passing a portion of the output of said pump around said lubricated surfaces and through a heat exchanger including a jacket surrounding a portion of said suction inlet pipe, means for passing the lubricant emerging from said heat exchanger in thermal exchange with said shaft seal, the capacity of said heat exchanger being such as to extract more heat from the lubricant passing therethrough than is imparted to all of the lubricant by the lubricated surfaces of the compressor and by said shaft seal, and means for returning the by-passed lubricant to the force-feed lubrication system after passing in thermal exchange with said shaft seal.

3. The combination with a refrigerant compressor comprising a housing, a suction inlet pipe attached thereto for conducting refrigerant into said housing, compressing mechanism enclosed in said housing, a force-feed lubrication system of the type including a pump for forcing lubricant to lubricated surfaces of the compressing mechanism, the lubricant escaping between certain of said surfaces into the interior of the compressor housing to be collected, admitted to said pump and recirculated through said lubrication system, a compressing mechanism driving shaft extending through an opening in said housing, and a shaft seal for preventing the escape of refrigerant from the interior of said housing through said opening; of means for by-passing a portion of the output of said pump around said lubricated surfaces and through a heat exchanger including a jacket surrounding a portion of said suction inlet pipe, means for passing the lubricant emerging from said heat exchanger in thermal exchange with said shaft seal including a housing surrounding said shaft seal, the capacity of said heat exchanger being such as to extract more heat from the lubricant passing therethrough than is imparted to all of the lubricant by the lubricated surfaces of the compressor and by said shaft seal, and means for returning the by-passed lubricant to the force-feed lubrication system after passing in thermal exchange with said shaft seal.

CHARLES R. NEESON.
REGINALD G. WYLD.